March 2, 1948. D. K. POPE 2,437,208
TWISTER RING LUBRICATING DEVICE
Filed Aug. 15, 1946 2 Sheets-Sheet 1
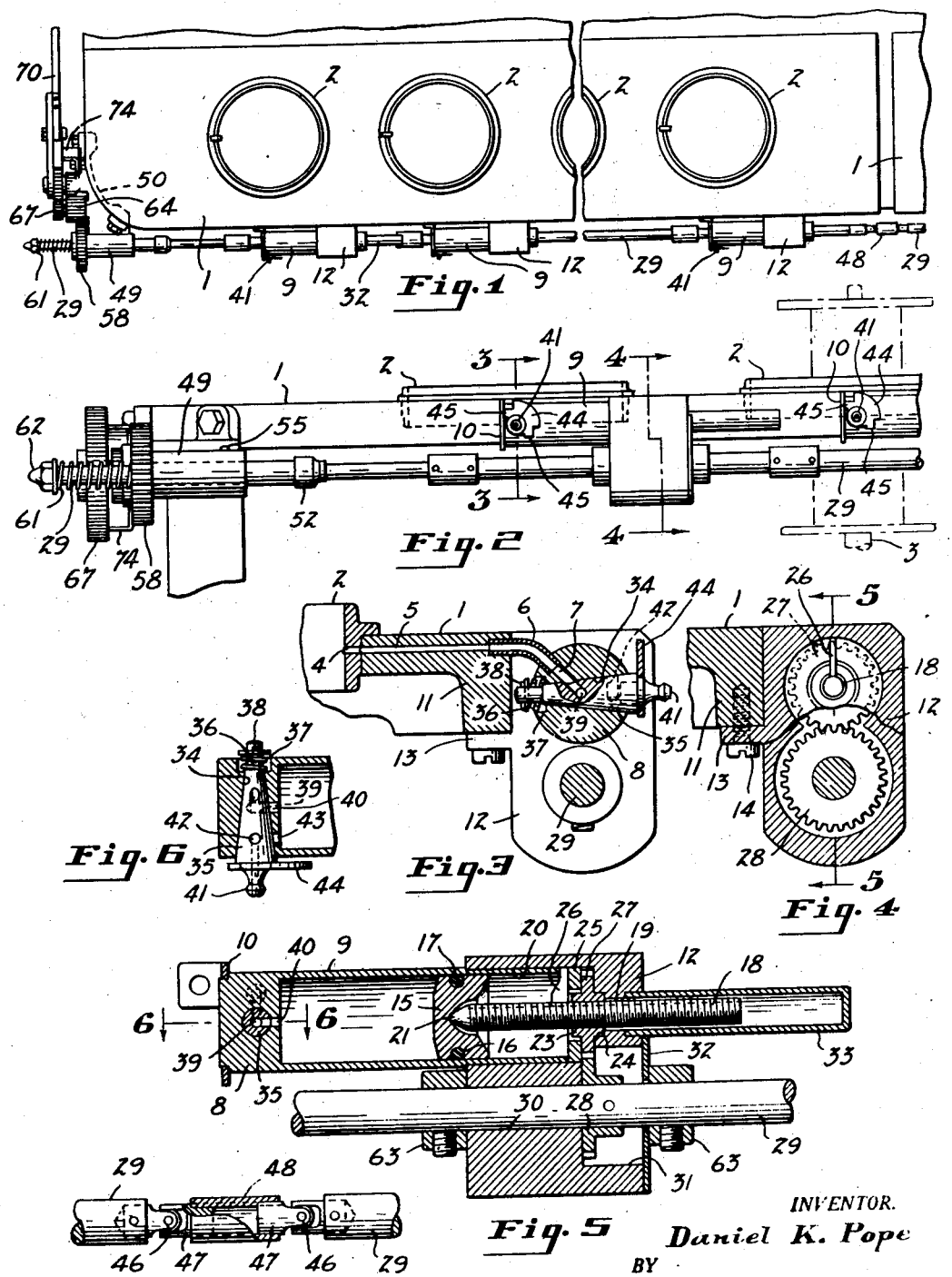
INVENTOR.
Daniel K. Pope
BY
Evans + McCoy
ATTORNEYS March 2, 1948.　　　D. K. POPE　　　2,437,208
TWISTER RING LUBRICATING DEVICE
Filed Aug. 15, 1946　　　2 Sheets-Sheet 2
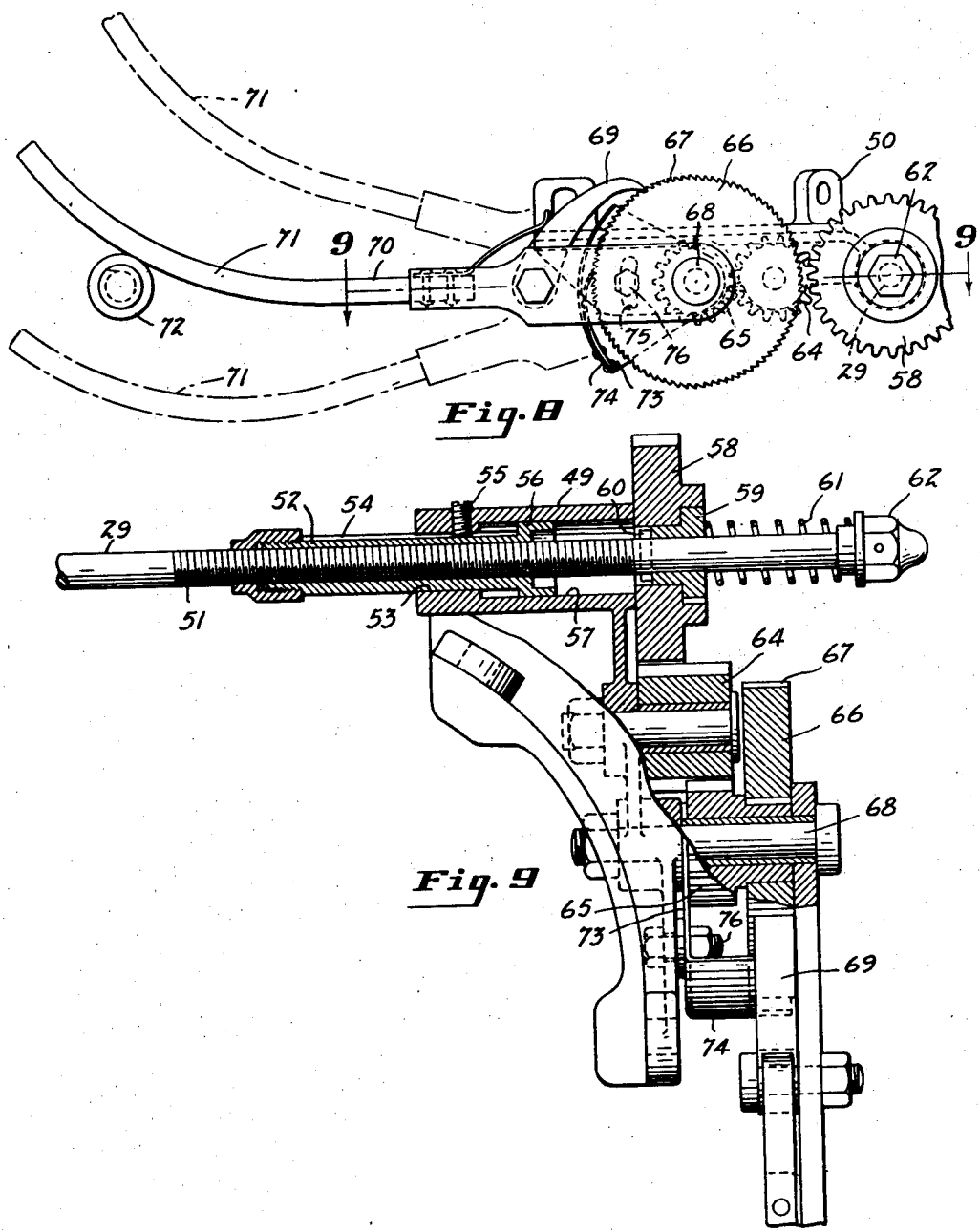
INVENTOR.
Daniel K. Pope
BY
Evans + McCoy
ATTORNEYS Patented Mar. 2, 1948

2,437,208

UNITED STATES PATENT OFFICE 2,437,208

TWISTER RING LUBRICATING DEVICE

Daniel K. Pope, Thomaston, Ga.

Application August 15, 1946, Serial No. 690,637

11 Claims. (Cl. 57—120)

This invention relates to lubricators for the rings of twisting machines or the like, and is an improvement on the device disclosed in my co-pending application, Serial No. 516,236, filed December 30, 1943.

The present invention has for an object to provide a device in which lubricant feed mechanism is provided for each ring and in which all of the lubricant feed mechanisms are operated by a line shaft supported upon the ring rails.

A further object of the invention is to provide housings for the gearing connecting each feed mechanism to the line shaft to protect the same from dust and lint.

An additional object of the invention is to provide valve controlled ports in the lubricant cylinder through which lubricant may be injected into the cylinder or discharged from the cylinder, the valve control being such as to insure closure of the outlet port during the injection of lubricant into the cylinder and closure of the inlet port while lubricant is being discharged from the cylinder to the ring.

Another object of the invention is to provide a line shaft having sections mounted on each of the ring rails which are connected end to end at adjoining ends of the ring rails in such manner that the rails may have slight relative movements during operation and in such manner that no damage will be done to the shafts or lubricating mechanism if one of the ring rails should remain stationary due to the failure of its actuating mechanism while adjacent rails continue to reciprocate.

With the above and other objects in view, the invention may be said to comprise the lubricator as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a plan view of a portion of a twister frame showing the invention applied thereto;

Fig. 2 is a fragmentary front elevation of a twister frame rail to which the device of the present invention is applied;

Fig. 3 is a transverse vertical section on the line indicated at 3—3 in Fig. 2;

Fig. 4 is a transverse vertical section taken on the line indicated at 4—4 in Fig. 2;

Fig. 5 is a fragmentary longitudinal vertical section taken on the line indicated at 5—5 in Fig. 4;

Fig. 6 is a fragmentary section through the valve that controls the discharge outlet and filling inlet of the cylinder, the section being taken on the line indicated at 6—6 in Fig. 5;

Fig. 7 is a fragmentary plan view partially in section showing the connection between sections of the line shaft through which the lubricant feed mechanisms are driven;

Fig. 8 is an end elevation of the shaft actuating mechanism showing the ratchet operated gearing for driving the line shaft, and Fig. 9 is a horizontal section taken on the line indicated at 9—9 in Fig. 8.

The device of the present invention is applied to a twister frame of conventional construction which is made up of a series of ring rails 1 arranged end to end throughout the length of the frame, each rail being provided with a series of apertures in which traveler receiving rings 2 are mounted. The ring rails 1 are mounted for simultaneous vertical reciprocation to move each of the rings 2 axially with respect to a vertical spindle extending centrally through the ring, one of the spindles being indicated at 3 in broken lines in Fig. 2. Each of the rings 2 is provided with one or more openings 4 which register with passages 5 formed in the rails 1 through which lubricant is fed to the interior face of the rings 2 to reduce the friction between the rings and the travelers which slide on the rings.

Each of the passages 5 is connected through a short conduit 6 to a passage 7 formed in the head 8 of a lubricant cylinder 9 which is supported at the outer edge of the ring rail in a position parallel to the rail. Each of the cylinders has an attaching bracket 10 permanently secured to its head 8, the bracket 10 being attached by suitable means such as screws to the front flange 11 of the rail 1. The opposite end of each cylinder 9 is supported by a member 12 which may be in the form of a casting provided with a flange 13 which may be secured to the flange 11 by means of screws 14. Each of the supporting members 12 is in the form of a block having an inner face that fits against the front face of the flange 11 and a top face which is brought flush with the top surface of the rail 1.

Each of the lubricant cylinders is provided with a plunger 15 which is provided with a peripheral groove 16 which receives an endless rubber sealing ring 17 which provides a fluidtight seal between the plunger and the cylinder. The plunger 15 is moved toward the head 8 to feed lubricant to the adjacent ring 2 by means of a screw 18 that extends through a bore 19 in the member 12 which is coaxial with the cylinder 9 which fits in a counterbore 20 in the member 12. The screw 18 has a pointed end 21 which engages in a tapering recess of the outer face of the plunger 15 and is adapted to be moved toward or away from the plunger 15 by means of a nut 23 that is rotatably mounted in a small counterbore 24 in the member 12 at the bottom of the counterbore 20. The nut is held against axial movement in the member 12 by a washer 25 that is interposed between the inner end of the cylinder 9 and the nut. The screw 18 is held against rotation by means of a key 26 which is carried by the washer 25 and which engages a longitudinal groove in the screw, the washer 26 being held by the cylinder 9 against rotation. The nut 23 has a gear 27 integral therewith that meshes with a gear 28 fixed to a drive shaft 29 which is disposed parallel to the cylinders 9. The shaft 29 is journaled in a bore 30 of each of the supporting members 12 and each of the supporting members is provided with a counterbore 31 to receive the gear 28. The counterbore 31 opens to the side of the member 12 opposite that from which the cylinder 9 extends and the counterbore 31 overlaps the counterbore 20 sufficiently to permit the gear 28 to mesh with the gear 27.

During operation of the frame, very small angular movements are imparted to the shaft 29 on each reciprocation of the rails, thereby imparting a slight endwise movement to the screws 18 and feeding a minute quantity of lubricant through the passages 5 to the rings 2. It is desirable that the actuating screw and its gearing be housed so that the screw and gears can be packed with lubricant and so that they will not be contaminated by lint and dust. To enclose these parts a closure plate 32 is attached to the face of the member 12 to cover the counterbore 31 and a cup-shaped shield 33 is attached to the member 12 and covers the projecting end of the screw 18.

In order to obtain an accurately regulated feed of minute quantities of lubricant to each of the rings, it is important that air be excluded from the portion of the cylinder 9 which contains the lubricant. In order to prevent entry of air into the cylinder while lubricant is being injected into the cylinder, the screw 18 is retractable from the plunger 15 so that the plunger may be returned from a position adjacent the head to a position adjacent the opposite end of the cylinder only by the pressure of lubricant forced into the cylinder, a valve being provided to close the discharge outlet while the cylinder is being filled. It is also desirable that the filling opening be properly sealed while lubricant is being fed from the cylinder.

The inlet and outlet ports of the cylinder are preferably controlled by a single valve which operates to seal the inlet port while lubricant is being fed to the rings and to seal the discharge port while lubricant is being injected through the inlet port into the cylinder.

As shown in Figs. 3 and 6, the head 8 is provided with a diametrical bore 34 of conical form which has a small angle of taper which receives a conical valve 35 which fits in the bore 34 and which may be turned in the bore. In order to maintain a tight seal between the valve body and its conical seat, a coil spring 36 is provided at one end of the valve body 35 which is mounted in a recess 37 in the head 8 and interposed between the bottom of the recess and a pin 38 at the inner end of the valve body 35. The spring 36 maintains an endwise pressure on the valve body 35 to maintain a close fluidtight fit between the valve body 35 and the bore 34. The valve body 35 is provided with a passage 39, one end of which in one position of the valve registers with the passage 7 in the head 8 and the other end of which registers with a passage 40 in the head 8 opening to the interior of the cylinder. In one position of the valve 35 communication is established through the passage 40 from the interior of the cylinder to the outlet passage 7. The valve body 35 has a grease gun nipple 41 at its outer end and is provided with a passage 42 from the outer end of the nipple 41 to a lateral opening 43 in the head 8 to the interior of the cylinder. The passage 42 is so located with respect to the passage 40 that the passage 42 is out of registry with the opening 43 when the passage 40 is in registry with the passage 7, and the passage 40 is out of registry with the passage 7 when the passage 42 is in registry with the opening 43. The valve 35 is provided with an operating handle 44 which has stops 45 engageable with the attaching bracket 10 to limit the movements of the valve. When one of the stops 45 is in engagement with the bracket 10 communication is established from the interior of the cylinder to the discharge passage 7 to feed the lubricant to the ring and when the opposite stop 45 is in engagement with the bracket 10, the outlet passage 7 is closed and communication is established between the grease gun nipple and the interior of the cylinder. By moving the plunger to its retracted position by the pressure of the grease injected into the cylinder while the discharge outlet remains closed, air is prevented from entering the cylinder and an accurate feed of lubricant is insured.

The drive shaft 29 of each ring rail is connected to similar shafts carried by adjacent rails to provide a line shaft extending throughout the full length of the frame and in order to permit slight relative movements of adjacent rails, flexible connections are provided between the section 29. As shown in Fig. 7, each of the half sections 29 is connected by a universal coupling 46 to a short externally splined shaft section 47 and the two spline sections 47 are slidable in an internally splined sleeve 48. This flexible connection permits slight relative movements of the ring rails during operation of the machine without affecting the operation of the line shaft. It also provides a safety connection between the shafts which will pull apart in the event that one of the ring rails should stop its reciprocating motion due to failure of its actuating mechanism. The coupling 46 and sleeve 48 will permit the sections of the line shaft to pull apart without damage to the shaft or the lubricating devices driven by the shaft in the event of excessive relative movement of adjacent rails.

The line shaft 29 is operated by mechanism mounted at one end of the twister frame and the shaft section 29 at that end of the frame is supported in a bearing member 49 carried by a bracket 50 attached to the end rail of the frame. The shaft 29 has a threaded portion 51 which receives a threaded sleeve 52 that is slidably mounted in a bore 53 formed in the bearing member 49. The sleeve 52 is provided with a longitudinal groove 54 which receives a pin 55 secured in the bearing member 49 so that the sleeve 52 is held against turning movement and is moved axially in the bearing member 49 as the shaft 29 is rotated. The sleeve 52 has an enlarged head 56 which slides in a counterbore 57 in the member 49 and which engages with a gear 58 that is slidable on the shaft 29. The gear 58 carries a clutch member 59 which engages with a clutch pin 60 carried by the shaft 29 and the gear 58 is held in clutch engaging position and against the outer end of the bearing member 49 by means of a coil spring 61 which is interposed between the gear 58 and a nut 62 at the outer end of the shaft 29. The gear 58 is normally held by the spring 61 in position in which it is clutched to the shaft 29 and is adapted to be moved by the head 56 of the sleeve 52 after a predetermined number of revolutions of the shaft 29, to a position in which the clutch member 59 is disengaged from the pin 60. The pin 60 is so adjusted with respect to the gear 58 that the driving gear 58 is disengaged from the shaft 29 when the plungers 15 have been advanced by the screws 18 to a position close to the heads 8 of the cylinders.

After the drive gear 58 has been disconnected from the shaft 29, the shaft 29 may be turned in a reverse direction by a suitable tool applied to the nut 62 to return all of the screws 18 to their retracted positions and to also move the sleeve 52 back to its retracted position. After the screws 18 have been retracted the valves 35 may be individually shifted to their filling position and lubricant may be introduced through the nipples 41 in the cylinders, moving the plungers 15 back into engagement with the retracted screws as the cylinders are filled with lubricant.

During the operation of the twister frame, very small turning movements are intermittently imparted to the shaft 29 upon each vertical reciprocation of the ring rails, and these small angular movements are imparted to the shaft through the gear 58 which is driven through an idler 64 from a gear 65 that rotates with a ratchet 66 that is provided with a large number of teeth 67. The ratchet 66 and gear 65 are rotatably mounted upon a shaft 68 carried by the bracket 50 and the ratchet is operated by means of a spring pressed pawl 69 carried by an actuating lever 70 that is pivoted to the shaft 68. The lever 70 has a curved end portion 71 that is engaged by a stationary roller 72 which imparts angular movements to the lever 70 during each reciprocation of the ring rails. Means is preferably provided for varying the amount of angular movement imparted to the ratchet 66 upon each actuation of the lever 70. A sector shaped shield 73 is provided with an arcuate flange 74 that closely overlies the periphery of the ratchet 66 and is adapted to be positioned so that the pawl 69 rides on the exterior face of the flange 74 during part of the movement of the levers 70. The shield 73 is provided with an arcuate slot 75 which receives a bolt 76 that is secured in the bracket 50. The shield 73 is pivoted to swing about the shaft 68 and is clamped in adjusted positions by means of a bolt 76. By adjusting the shield 73 the amount of angular movement imparted to the ratchet by the pawl 69 upon each stroke of the lever may be regulated.

It is to be understood that variations and modifications of the specific devices herein shown and described for purposes of illustration, may be made without departing from the spirit of the invention.

What I claim is:

1. In a twisting machine in which the spindles are centered in traveler rings and in which a series of rings reciprocate simultaneously with respect to the spindles, a supporting member mounted in a fixed position with respect to each of said rings, a lubricant reservoir carried by each supporting member and having an outlet, a plunger in each reservoir for forcing lubricant through the reservoir outlet, a conduit connecting each reservoir outlet to the interior of a ring, a shaft journaled in said supports, means for imparting a predetermined turning movement to said shaft upon each relative reciprocating movement to said shaft upon each relative reciproating movement of said rings and spindles, and an actuator for each plunger geared to said shaft.

2. In a twisting machine in which the spindles are centered in traveler rings and in which a series of rings reciprocate simultaneously with respect to the spindles, a supporting member mounted in a fixed position with respect to each of said rings, a lubricant reservoir carried by each supporting member and having an outlet, a plunger in each reservoir for forcing lubricant through the reservoir outlet, a conduit connecting each reservoir outlet to the interior of a ring, a shaft journaled in said supports, an actuating mechanism controlled by the relative reciprocating movements of said rings and spindles, means including a clutch for driving said shaft from said actuating mechanism, means for automatically disengaging said clutch upon the completion of a predetermined turning movement of the shaft, and an actuator for each plunger geared to said shaft.

3. In a twisting machine in which the spindles are centered in traveler rings and in which a series of rings reciprocate simultaneously with respect to the spindles, a supporting member mounted in a fixed position with respect to each of said rings, a shaft journaled in said supporting members, a lubricant cylinder mounted on each support with its axis parallel to the shaft, a plunger in each cylinder, a screw coaxial with each cylinder and engaging the plunger therein, a nut on said screw geared to said shaft, means for holding said screw against turning movement and said nut against axial movement, means for imparting a predetermined turning movement to the shaft upon each relative reciprocating movement of the rings and spindles, and means including a passage through each ring for conducting lubricant from the cylinders to the interior faces of said rings.

4. In a twisting machine having a spindle and a ring coaxial with the spindle which has axial reciprocating motion relative to the spindle, a supporting member mounted in fixed position with respect to the ring, a lubricant feeder carried by the support for delivering lubricant to the interior face of the ring, said feeder comprising a cylinder having an outlet at one end connected to the ring and a plunger for forcing lubricant through said outlet, an axially movable screw mounted in the end of the cylinder opposite the outlet, said screw being coaxial with the cylinder and having its inner end engageable with said plunger to move the same toward the said outlet, a nut on said screw, means for holding said nut against axial movements and said screw against turning movements, and means controlled by the relative reciprocating movements of the ring and spindle for intermittently imparting turning movements to said nut in a direction to advance said plunger toward said outlet.

5. In a twisting machine having a spindle and a ring coaxial with the spindle which has axial reciprocating motion relative to the spindle, a supporting member mounted in fixed position with respect to the ring, a lubricant cylinder carried by said support having a lubricant discharging outlet and a lubricant receiving inlet at one end, means providing a passage from said outlet to the interior of the ring, a plunger slidable in said cylinder and adapted to be moved to the end of the cylinder remote from the outlet by the pressure of lubricant introduced through said inlet into the cylinder, means operating in timed relation to the relative reciprocation of the spindle and ring to intermittently advance said plunger toward said outlet, and a valve in said cylinder controlling said inlet and outlet and movable from a position closing said inlet and opening said outlet to a position opening said inlet and closing said outlet.

6. In a twisting machine having a ring rail, a supporting member adapted to be attached to an edge of said rail and having a side face engageable with said edge, said member having a face parallel with said side face and a coaxial counterbore, said member having a second face parallel to the first and a second counterbore oppositely disposed with respect to the first and overlapping the same laterally and axially, a lubricant cylinder having an outlet at one end connected to a ring and having its opposite end fitting in the said counterbore, means for holding said cylinder against endwise movement, a plunger in said cylinder, a nut rotatably mounted in said member at the bottom of the first counterbore coaxially with the cylinder and held against axial movements, a screw in threaded engagement with the nut and movable toward and away from said plunger, a key engageable with said screw to hold it against rotation, a drive shaft journaled in said second counterbore, a gear fixed to said shaft in said second counterbore, and a gear carried by said nut and meshing with the first mentioned gear.

7. In a twisting machine having a ring rail, a supporting member adapted to be attached to an edge of said rail and having a side face engageable with said edge, said member having a face parallel with said side face and a coaxial counterbore, said member having a second face parallel to the first and a second counterbore oppositely disposed with respect to the first and overlapping the same laterally and axially, a lubricant cylinder having an outlet at one end connected to a ring and having its opposite end fitting in the said counterbore, means for holding said cylinder against endwise movement, a plunger in said cylinder, a nut rotatably mounted in said member at the bottom of the first counterbore coaxially with the cylinder and held against axial movements, a screw in threaded engagement with the nut and movable toward and away from said plunger, a key engageable with said screw to hold it against rotation, a drive shaft journaled in said second counterbore, a gear fixed to said shaft in said second counterbore, a gear carried by said nut and meshing with the first mentioned gear, a cover for the outer end of said screw, and a cover for the open end of said second counterbore whereby said gears are enclosed in a grease retaining housing.

8. In a twisting machine having a ring rail, a supporting member adapted to be attached to an edge of said rail and having a side face engageable with said edge, said member having a face parallel with said side face and a coaxial counterbore, said member having a second face parallel to the first and a second counterbore oppositely disposed with respect to the first and overlapping the same laterally and axially, a lubricant cylinder having an outlet at one end connected to a ring and having its opposite end fitting in the said counterbore, means for holding said cylinder against endwise movement, a plunger in said cylinder, a nut rotatably mounted in said member at the bottom of the first counterbore coaxially with the cylinder and held against axial movements, a screw in threaded engagement with the nut and movable toward and away from said plunger, a key engageable with said screw to hold it against rotation, a drive shaft journaled in said second counterbore, a gear fixed to said shaft in said second counterbore, a gear carried by said nut and meshing with the first mentioned gear, and a valve controlled inlet through which lubricant may be introduced into said cylinder.

9. In a twisting machine having a plurality of vertically reciprocating ring rails arranged end to end, a ring lubricating mechanism comprising lubricant feeders mounted on each rail, and an operating shaft extending along the length of a plurality of rails and geared to said feeders, said shaft comprising elongated sections mounted one on each rail and a flexible connection between the adjoining end of said sections which comprises two short shaft sections connected to adjoining elongated shaft sections by universal joints and a sleeve slidably keyed to said short shaft sections.

10. In a twisting machine having a ring and spindle which have relative axial reciprocating movements, a lubricant cylinder mounted in fixed position with respect to said ring and having a lubricant discharging outlet and a lubricant receiving inlet adjacent one end, means providing a passage from said cylinder outlet to the interior of the ring, a plunger slidable in said cylinder, means controlled by the relative reciprocating movements of the ring and spindle for moving said plunger toward said outlet, means for releasing said plunger from said moving means so that it may be moved by the pressure of lubricant introduced through said inlet, and a valve controlling said inlet and said outlet and movable from a position closing said inlet and opening said outlet to a position opening said inlet and closing said outlet.

11. In a lubricator for twister rings, a lubricant cylinder having an outlet adjacent one end for delivery of lubricant to a ring and an inlet adjacent the same end through which lubricant may be forced into the cylinder, a plunger in said cylinder movable toward said outlet to force lubricant from the cylinder and adapted to be moved in the reverse direction by lubricant forced into the cylinder through said inlet, and a valve in said cylinder movable from a position closing said inlet and opening said outlet to a position opening said inlet and closing said outlet.

DANIEL K. POPE.

Certificate of Correction

Patent No. 2,437,208.                                                                                      March 2, 1948.

DANIEL K. POPE

It is hereby certified that error appears in the printed specification of the above numbered patent requiring correction as follows: Column 6, lines 12 and 13, claim 1, strike out "to said shaft upon each relative reciproating movement"; and that the said Letters Patent should be read with this correction therein that the same may conform to the record of the case in the Patent Office.

Signed and sealed this 18th day of May, A. D. 1948.

[SEAL]

THOMAS F. MURPHY,
*Assistant Commissioner of Patents.*